United States Patent Office.

CARL DUISBERG, OF ELBERFELD, GERMANY, ASSIGNOR TO THE FARBENFABRIKEN, VORMALS FR. BAYER & CO., OF SAME PLACE.

TETRAZO BLUE DYE.

SPECIFICATION forming part of Letters Patent No. 476,371, dated June 7, 1892.

Application filed July 16, 1891. Serial No. 399,695. (Specimens.) Patented in Germany November 19, 1885, No. 40,247; in England November 24, 1885, No. 14,424; in France December 19, 1885, No. 173,042; in Austria-Hungary May 7, 1886, No. 20,062 and No. 48,178, and in Italy June 30, 1886, Nos. 39/329.

*To all whom it may concern:*

Be it known that I, CARL DUISBERG, doctor of philosophy, of Elberfeld, in the Empire of Germany, and assignor to the FARBENFABRIKEN, VORMALS FR. BAYER & CO., of Elberfeld, have invented a new and useful Improvement in the Manufacture of a Tetrazo Dye-Stuff Derived from Dianisidine, (for which the aforesaid FARBENFABRIKEN, VORMALS FR. BAYER & CO., of Elberfeld, have already obtained Letters Patent in Germany, No. 40,247, dated November 19, 1885; in England, No. 14,424, dated November 24, 1885; in France, No. 173,042, dated December 19, 1885; in Austria-Hungary, No. 20,062 and No. 48,178, dated May 7, 1886, and in Italy Nos. 39/329, dated June 30, 1886,) of which the following is a specification.

I give in the following a clear and exact description both of the production and of the qualities of my new dye-stuff.

My invention relates to the manufacture of a new blue-mixed tetrazo color of the following formula:

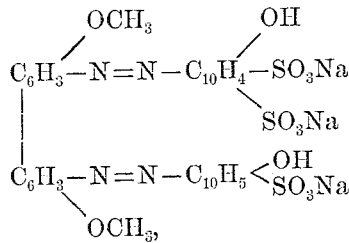

and which is prepared by combining with one molecular proportion of the tetrazo derivative of dianisidine (diamido-ortho-diphenoldimethylether) one molecular proportion of the beta-naphtholdisulpho-acid R, as referred to in Thorpe's Dictionary of Applied Chemistry, Vol. 2, page 680, 1891, and one molecular proportion of the alpha-naphtholalphamonosulpho-acid (Clève) that may be obtained from the corresponding alpha-naphthylamineal-phamonosulpho-acid, as referred to in Thorpe's Dictionary of Applied Chemistry, September 2, 1891, Vol. 2, page 669.

As to the manufacture of my new dye-stuff, I proceed in the following manner: 24.4 kilos, by weight, of dianisidine are dissolved in about three hundred and seventy-five liters of water and 48.8 kilos, by weight, of muriatic acid of the specific gravity 1.161. This solution, cooled by ice, is slowly mixed with a cold watery solution of fourteen kilos of sodium nitrite. The reddish-yellow solution of the tetrazo-diphenoldimethylether is thereupon introduced into the watery solution of 34.8 kilos, by weight, of the pure sodium salt of the above-mentioned beta-naphtholdisulpho-acid R, and as the most practical method on the addition of the soda salt of acetic acid, the formation of the intermediate product containing one molecule of the naphtholdisulpho-acid joined to one molecule of the tetrazo-ether is complete, the mixture resulting is added to about twenty-seven kilos, by weight, of the sodium salt of alpha-naphtholalphamonosulpho-acid (Clève) dissolved in water advantageously, adding such a quantity of sodium carbonate that the liquid remains alkaline till the combination is finished.

The formation of the new dye-stuff is complete after about twenty-four hours' standing. In consequence of its insolubility in cold water it separates almost perfectly, and therefore may directly be isolated by filtering off.

The new coloring-matter, of course, is of the same molecular formula as the product resulting by the combination of one molecular proportion of tetrazo-ortho-diphenoldimethylether with one molecular proportion of beta-naphtholdisulpho-acid R and one molecular proportion of alpha-naphtholalphamonosulpho-acid, (Neville-Winther,) but differs from the latter dye-stuff by containing as one component the isomeric alpha-naphtholalphamonosulpho-acid (Clève) instead of the alpha-naphtholalphamonosulpho-acid, (Neville-Winther.)

My new coloring-matter forms when it has been perfectly dried a violet-black powder, is moderately soluble in cold, more easily in hot water with violet-blue color, which is changed into blue-red by the addition of alkalies. It is dissolved by soda-lye and ammonia with the same blue-red color and by concentrated sulphuric acid with deep-blue color, from which solution, after the addition of water, a blue precipitate is separated. It dyes unmordanted cotton in baths only containing common salt in shades with a little greener hue than the analogous coloring-matter that is formed by coupling one molecule of the tetrazo compound of dianisidine with one molecule of beta-naphtholdisulpho-acid R and one molecule of alpha-naphtholalphamonosulpho-acid, (Neville-Winther.)

Having thus exactly described my invention and in what manner it may most practically be performed, that which I claim as new, and desire to secure by Letters Patent, is—

1. The herein-described new direct dyeing tetrazo dye-stuff having the formulæ substantially as described and which is a violet-black powder soluble in water with violet-blue color, that is reddened by alkalies and soluble in concentrated sulphuric acid with a dark-blue color, from which on dilution with water the color separates out, and dyeing unmordanted cotton in baths with common salt a greener blue than does the analogous coloring-matter containing the alpha-naphtholalphamonosulpho-acid.

2. The process for the production of a new direct dyeing tetrazo dye-stuff by combining one molecular proportion of the tetrazo compound of dianisidine with one molecular proportion of beta-naphtholdisulpho-acid R and then with one molecular proportion of alpha-naphtholalphamonosulpho-acid, (Clève.)

CARL DUISBERG.

Witnesses:
WM. DIESTEL,
HUGO BREDDINGHAUS.